United States Patent

[11] 3,524,418

| [72] | Inventor | William C. Cowan |
| | | Shelby County, Tennessee |
| [21] | Appl. No. | 825,111 |
| [22] | Filed | May 2, 1969 |
| | | Continuation-in-part of Ser. No. 718,834, filed Apr. 4, 1968, abandoned. |
| [45] | Patented | Aug. 18, 1970 |
| [73] | Assignee | Fifty percent to Rees Burner & Blow Pipe Co., Memphis, Tennessee |

[54] INDUSTRIAL BURNER DRAUGHT REGULATING MECHANISM
12 Claims, 6 Drawing Figs.

[52] U.S. Cl.................................................. 110/18, 110/163
[51] Int. Cl..................................................... F23g 7/00
[50] Field of Search........................................... 110/7, 8, 18, 97, 119, 163

[56] References Cited
UNITED STATES PATENTS
1,339,729  5/1920  Walsh............................ 110/18
2,580,534  1/1952  Escher........................... 110/97

FOREIGN PATENTS
520,314  3/1931  Germany ................... 110/163

Primary Examiner— Kenneth W. Sprague
Attorney— John R. Walker, III

ABSTRACT: For use with a typical large industrial conical burner having a screened outlet arranged at its apex for the emission of combustion gases and residue of combustion; mechanism comprising combustion air draught regulating means including two vertically spaced centrally apertured baffle members arranged in the upper interior of the burner and with one of the apertured baffle members being movable relative to the other for regulating the flow of combustion gases and residue emitted into the outside atmosphere.

A second embodiment is also included which comprises a generally annular baffle body adapted to be stationarily supported horizontally in the upper interior of the industrial burner body and a plurality of coactingly operative doors pivotally mounted on the annular baffle body adapted to be pivotally moved either together or separately between open or closed dispositions.

Patented Aug. 18, 1970

INVENTOR.
WILLIAM C. COWAN
BY John R. Walker, III
Attorney

INVENTOR.
WILLIAM C. COWAN
BY John R. Walker, III
Attorney

INVENTOR.
WILLIAM C. COWAN

BY John R. Walker, III
Attorney 3,524,418

INDUSTRIAL BURNER DRAUGHT REGULATING MECHANISM

CROSS REFERENCE TO RELATED APPLICATION

This is a continuation-in-part of my copending application, Serial No. 718,834, filed April 4, 1968, entitled "Industrial Burner Draught Regulating Mechanism", now abandoned.

BACKGROUND OF THE INVENTION

Field of the invention

Relates to draught control means in industrial burners particularly large conically shaped burners used for burning industrial waste products.

Description of the prior art

Great attention is currently being directed toward the problem of air pollution and in many areas anti-pollution laws have been enacted. Industrial burners particularly are subject to close scrutiny and regulatory actions in efforts to prevent air pollution.

Heretofore in the industrial burner art the practice has been to control the burning of the waste fuel generally by two means: (1) By providing the burner with a series of adjustable ventilators tangentially arranged about the base of the burner; and (2) In burners having forced air supply means, to regulate the amount of air being forced into the burner. Both of the above mentioned fire control means effect control of the waste fuel burning by regulating or determining the amount of air entering the burner housing.

In prior art burners the typical burner is provided with an open top through which the gases and residue of combustion are free to pass into the outside atmosphere. In burners such as this, smoke and a considerable amount of so-called "fly ash" residue is permitted to pass into the atmosphere with the fly ash settling on the surrounding area. It is difficult to control the waste fuel burning in such burners and the burning rate of the material tends to fluctuate to a hot and cold side of an efficient burning rate. For substantially complete and efficient combustion or burning of the waste material, a particular burner should be set or adjusted to run at an optimum temperature or heat range. Heretofore, in the industrial burner art, the practice has been to regulate the burning by regulating the amount of air entering the burner or regulating the amount of waste material being fed into the burner. Since it is not always possible to regulate the amount of waste material entering the burner, improper or inefficient combustion of the waste material often occurred. In many cases the optimum operating temperature could not be reached as when the influx of material into the burner was at a low rate below the normal capacity of the burner.

SUMMARY OF THE INVENTION

The present invention provides means for regulating the draught and the exit gas temperature of a conical burner by positioning adjustable damper or baffle means over the fire and at the chimney or flue outlet. By the use of the present invention in a burner, the effective capacity of the burner can be changed so that an efficient exit gas temperature can be maintained to provide optimum conditions as to minimum smoke and fly ash. Thus, for example, with a low rate of influx of material, the baffling means can be moved towards closure to raise the temperature to the optimum level. Conversely, in the same refuse burner with a higher rate of influx of material, the baffling means can be moved in an opening direction to lower the temperature.

One form of the invention includes a pair of baffle portions with one baffle portion being movable vertically relative to the other baffle portion to vary the effective opening of the baffle means. The invention also includes a modified burner draught regulating mechanism comprising a generally annular baffle body adapted to be stationarily supported horizontally in the upper interior of the industrial burner body and a plurality of coactingly operative doors pivotally mounted on the annular baffle body adapted to be pivotally moved either together or separately between open or closed dispositions to vary the effective opening of the baffle means.

DESCRIPTION OF THE PREFERRED EMBODIMENT

Figure 1:
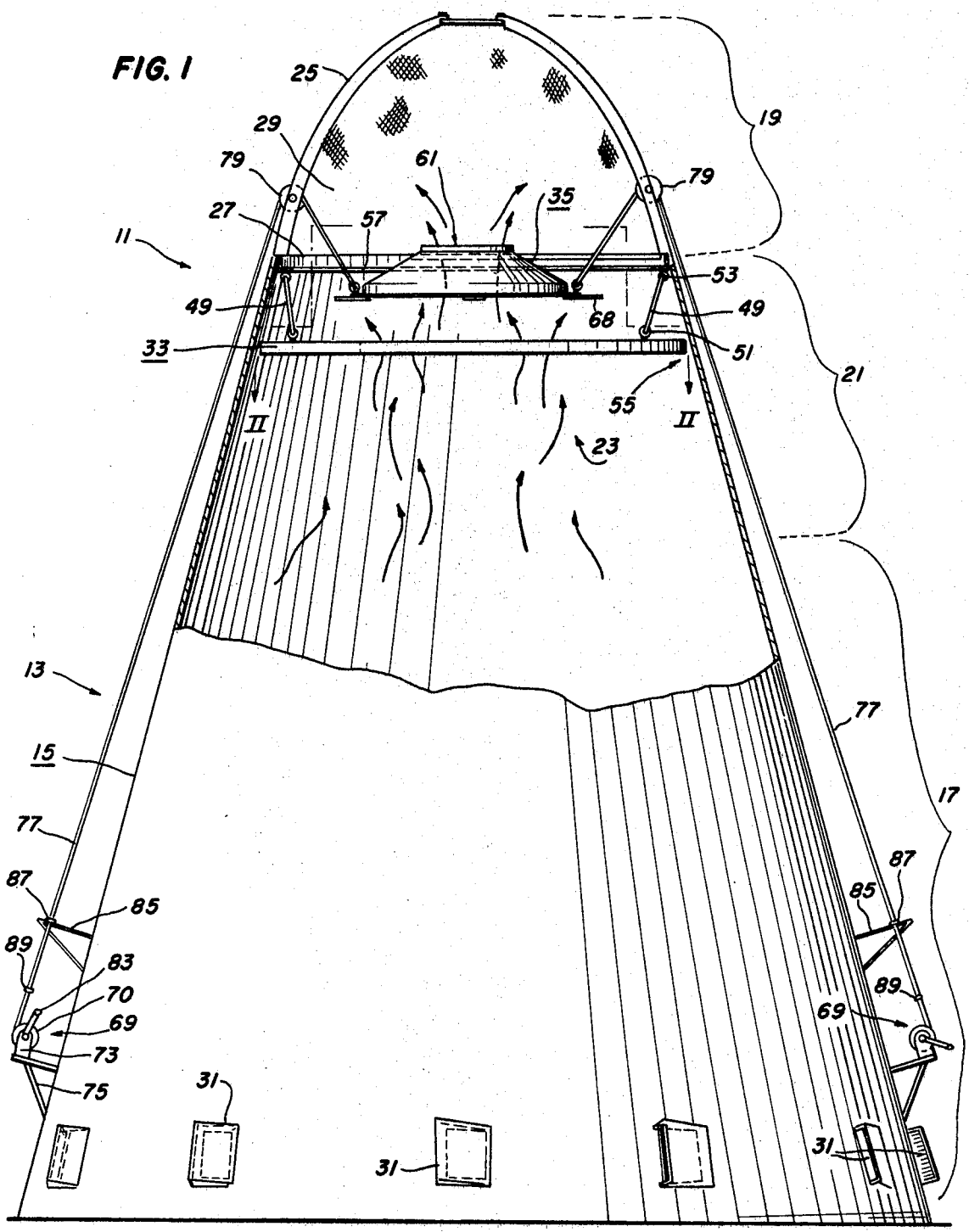
FIG. 1 is a side view of a conical industrial burner provided with a preferred or first embodiment of the draught regulating apparatus of the present invention (the burner being shown partly in section).
Figure 2:
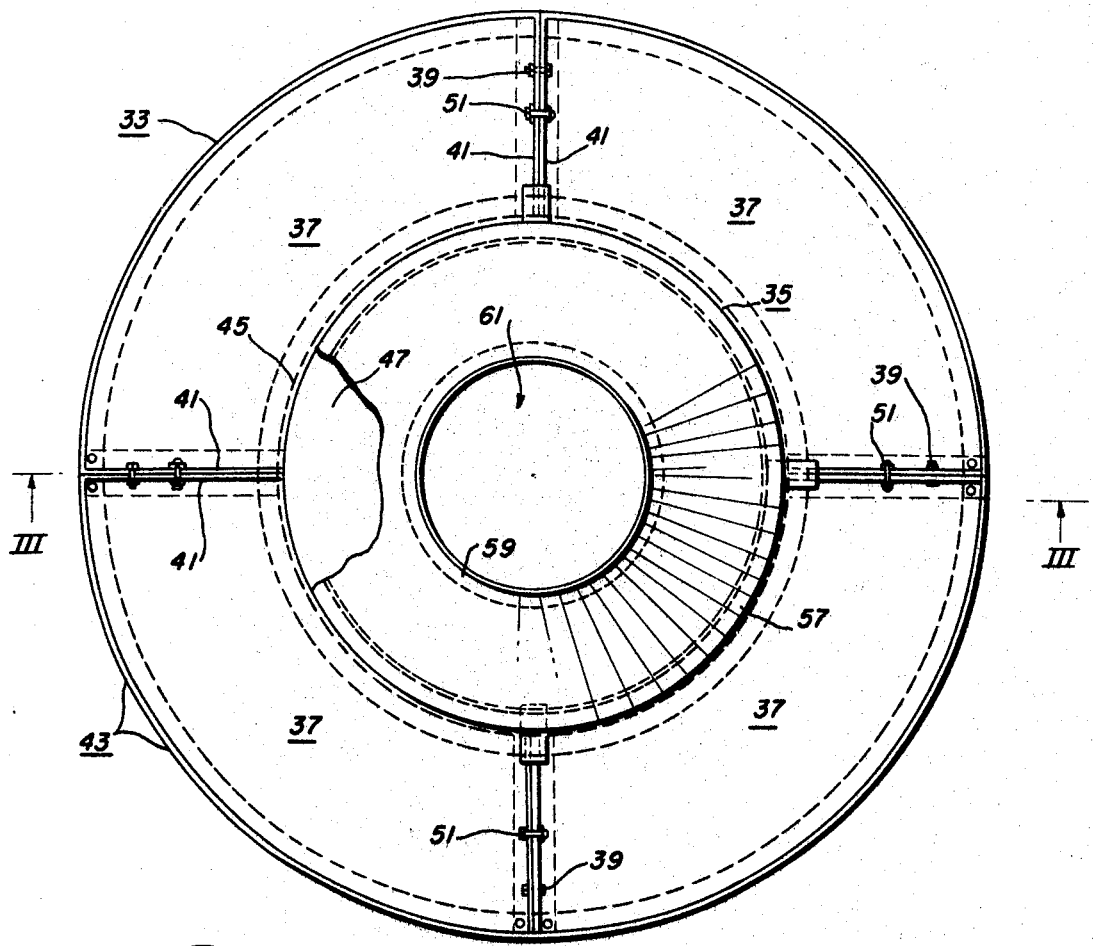
FIG. 2 is a top view of the damper means of the present invention taken as on the line II-II of FIG. 1 (with parts being fragmentarily shown).
Figure 3:
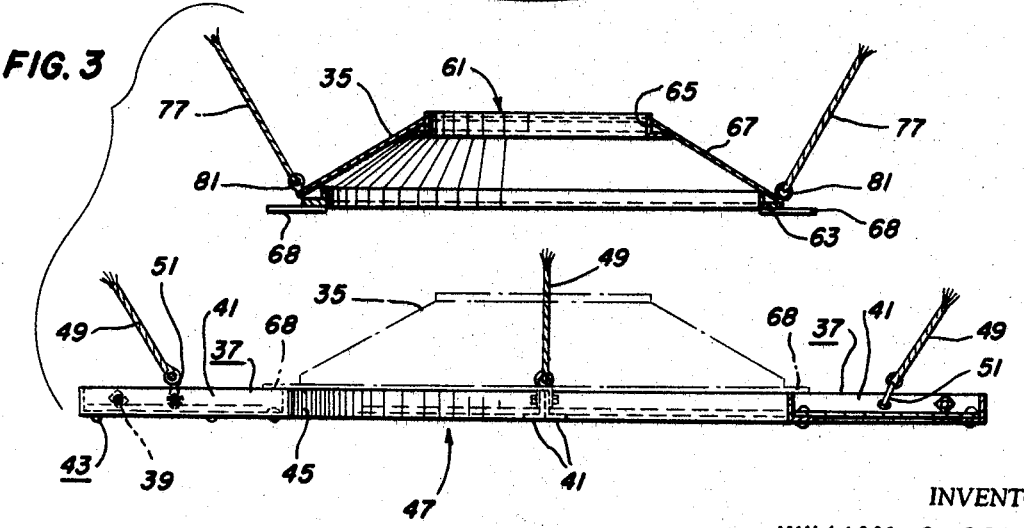
FIG. 3 is a vertical plane sectional view of the damper means taken as on the line III-III of FIG. 2.

The burner draught regulating mechanism is indicated by numeral 11 and is illustrated in conjunction with a typical industrial burner 13 having a conically-shaped burner body 15 having lower, upper and intermediate burner body sections 17, 19, 21 respectively. Lower and intermediate sections 17, 21 of burner body 15 preferably are integrally formed substantially of heavy gauge sheet metal material formed with ribs (not shown) and utilizing circular rings, interior or exterior (not shown) as is typical in the art. Waste fuel material is introduced into the interior of body 15 by suitable means (not shown) and into lower section 17. The gases and combustion residue from the burning waste fuel in lower section 17 rise and pass through flue passageway 23 in intermediate section 21, through screened upper section 19 and into the atmosphere. Framework 25 securely anchored on circular brim 27 of intermediate section 21 typically supports perforated sheeting or screen 29 of upper section 19. As is typical in the art, a series of ventilators 31 are arranged circumferentially around the base portion of lower section 17 of burner body 15. Typically each ventilator 31 is adjustable for regulating the passage of air into the interior of body 15.

Burner draught regulating apparatus 11 basically comprises baffle means including a first apertured baffle or baffle portion 33, a second apertured baffle or baffle portion 35 and means for changing the effective opening through the baffle means. This is done by vertically positioning one baffle relative to the other baffle to regulate the passage of air through burner body intermediate section 21. Preferably, second baffle 35 is vertically movable relative to first baffle 33.

First baffle 33 preferably, although not necessarily, is of flat annular configuration and formed substantially of quarter sections 37 secured together by threaded fasteners 39 fastening through radially extending angle irons 41. Assembled quarter sections 37 of first baffle 33 define outside rim structure 43 extending circumferentially continuously around the outer periphery of baffle 33. Inside rim structure 45 arranged concentrically of structure 43 defines a large circular draught opening 47.

First baffle 33 is horizontally suspended in burner body intermediate section 21 by a plurality of hanging rods or wire rope 49 arranged intermittently around the outer periphery of first baffle 33. Each wire rope strand 49 is fixedly anchored at opposite end portions respectively to circular brim 27 of body section 21 and angle iron members 41 of first baffle 33. Eye bolt means 51, 53 anchored respectively in brim 27 of body section 21 and baffle 33 stationarily support baffle 33 at a selected elevation in burner body 15. The relative proportions respectively of the interior of burner body intermediate section 21 and the outside diameter of first baffle 33 is such that the outer periphery or rim structure 45 of first baffle 33 is contiguous the inside surface of body section 21; the relative arrangement or proportions of parts is such that only slight spacing is permitted as indicated by numeral 55 (see FIG. 1). The construction is such that substantially all gases of combustion pass through draught opening 47 of first baffle 33.

Second baffle 35 is constructed in similar manner to baffle 33 and includes circular outside rim structure 57, and inside rim structure 59 defining a curcular draught opening 61. Second baffle 35, however, is substantially smaller than first baffle 33 and preferably, although not necessarily, formed frusto-conically. Lower and upper circular angle iron members 63, 65 are rigidly interconnected by frusto-conical sheeting 67. Circular angle iron 63 and outside rim structure 57 of second baffle 35 is preferably of substantially the same diameter as the inside diameter of inside rim structure 45 of first baffle 33. A plurality of stop members 68 are fixedly attached to angle members 63 and extending radially outwardly therefrom to engage rim structure 45 when baffle 35 is lowered to prevent baffle 35 from going through opening 47. The relative diameter of draught openings 47, 61 of first and second baffles 33, 35 may be varied to suit the particular application of the invention and is determined substantially by the moisture content and combustion characteristics of the particular waste material being processed.

Second baffle 35 is pendantly supported directly and concentrically over first baffle 33 and is adapted to be raised and lowered relative to baffle 33. The means for positioning second baffle 35 relative to first baffle 33 preferably includes a plurality of windlass mechanisms 69 arranged intermittently about burner body 15: Each windlass mechanism 69 includes a drum 70 journaled in bearing plates 73 supported from body lower section 71 on support structure 75. An elongated flexible pull member 77, as a chain or steel cable, is firmly secured at its proximal end to drum 70 and at its outer or distal end to second baffle 35. Pull member 77 extends over a pulley 79 arranged at an elevation above second baffle 35 and freely journaled on framing 25 of burner upper section 19. An eye member 81 fixedly secured in outer rim structure 57 of second baffle 35 anchors the distal end of pull member 77 to baffle 35. A crank handle 83 and ratchet means (not shown) provide means for turnably manipulating drum 70 and elevatingly supporting baffle 35 at a desired elevation.

Indicator means in the form of a pointer 85 and ferrule members 87, 89 at each windlass mechanism 69 provide means for determining the relative positions of first and second baffles 33, 35. Pointer 85 is fixedly secured to and extends right angularly from body lower section 17. Upper and lower ferrule members 87, 89 are firmly secured on spaced portions of pull member 77. When upper ferrule 87 is in horizontal alignment with pointer 85, second baffle 35 is at a fully raised disposition; when lower ferrule 89 is in horizontal alignment with pointer 85, upper baffle 35 is in a fully lowered disposition and only slightly clears the upper surfaces of lower baffle 33. An attendant or operator of burner 13 may by visual observation of the pointer and ferrule means 85, 87, 89 readily determine the relative arrangement of first and second baffles 33, 35. Such pointer and ferrule means 85, 87, 89 also is useful in positioning or maintaining second baffle 35 in a horizontal position and parallel with first baffle 33.

The effective capacity of burner 11 may be controlled by raising or lowering second baffle 35 relative to first baffle 33. Thus, if the amount of material introduced into the burner is at a low rate below the otherwise normal capacity of the burner without the present invention, the second baffle 35 may be lowered to hold more of the heat and combustion gases in the burner and raise the temperature to an efficient operating temperature so that optimum conditions as to smoke and fly ash are obtained. On the other hand, if the amount of material introduced is at a high rate, the second baffle 35 may be raised to lower the temperature to an efficient operating temperature. Also, by reducing the velocity of the upward currents of hot air passing from the burner the waste has more time within the chamber to be more completely consumed. Turbulence is also created in upper section 21 causing a mixing of hot air and particles. The result is that less dust and fly ash is carried outside the burner. The fly ash and combustion residue is contained in the burner and has a tendency to settle in the base of the burner. This functional feature promotes air cleanliness.

It will be understood that under certain circumstances it may be desirable to omit one of the baffles 33, 35, in which case adjustable baffling effects may be provided by raising or lowering the remaining baffle. Also, if desired, the specific shapes of the baffles may be changed without departing from the spirit and scope of the present invention.

DESCRIPTION OF THE SECOND EMBODIMENT

Figure 4:
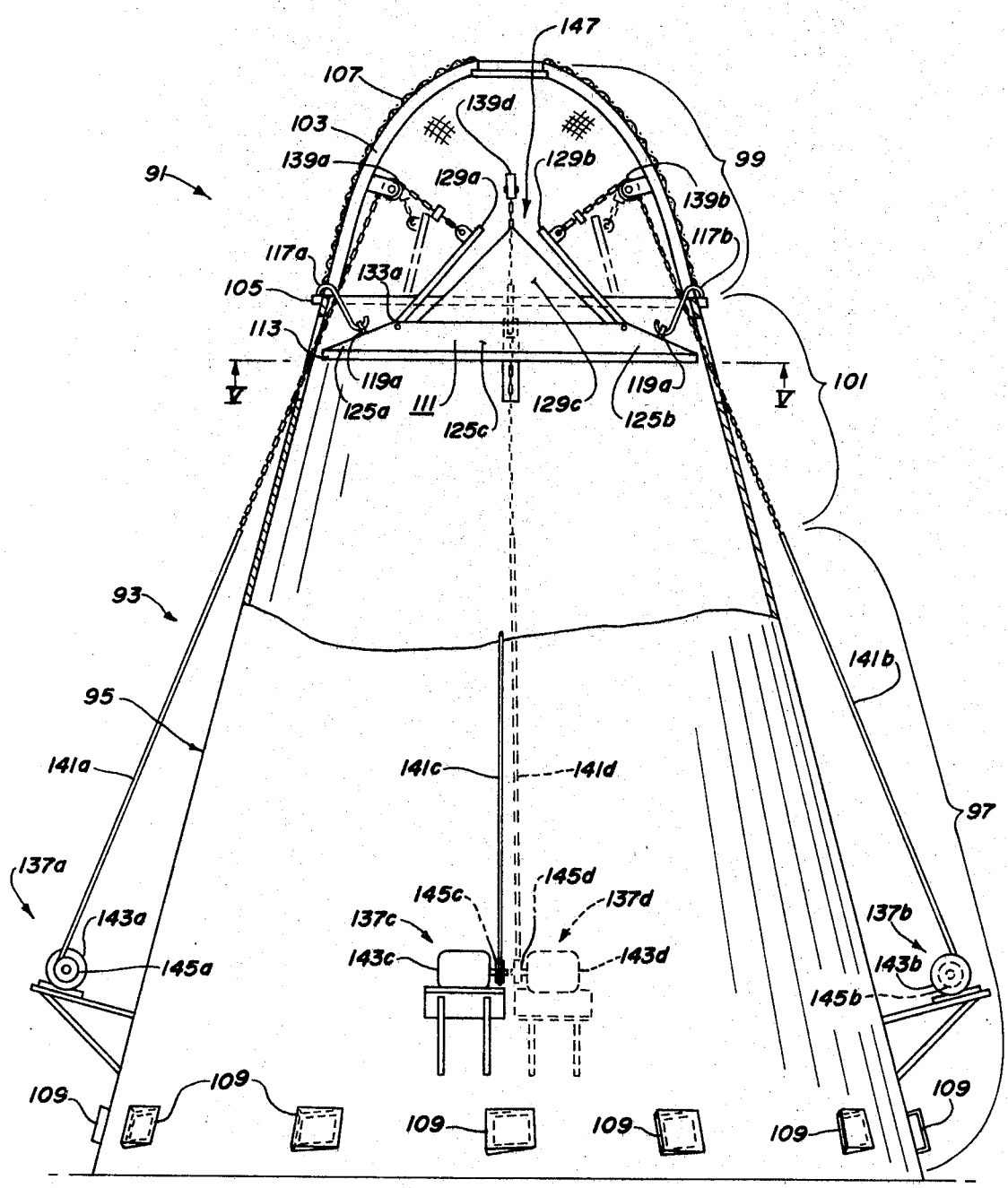
FIG. 4 is a side view of a conical industrial burner provided with a second embodiment of the draught regulating apparatus of the present invention.
Figure 5:
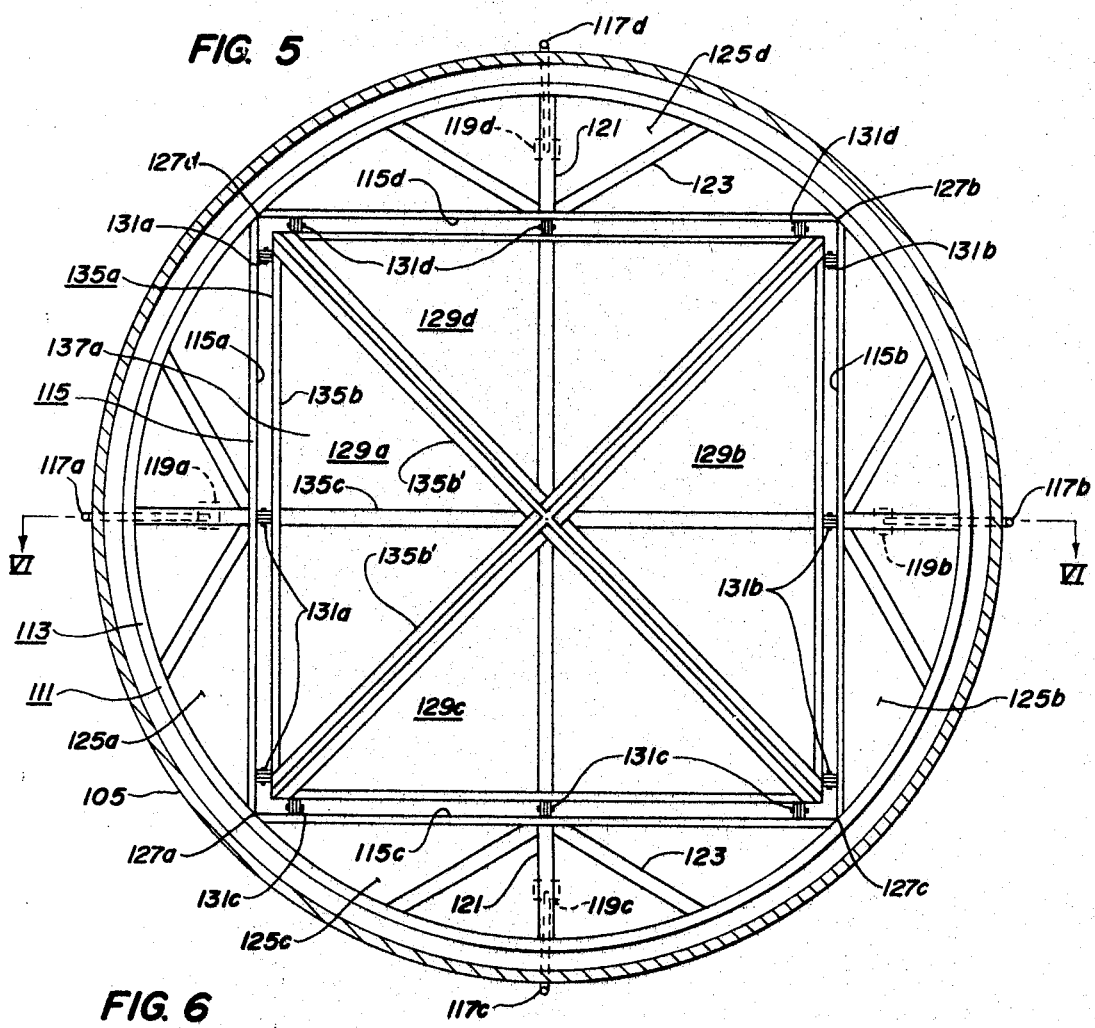
FIG. 5 is a horizontal plane sectional view of the baffle means of the second embodiment of the invention as viewed upwardly on the line V-V of FIG. 4.
Figure 6:
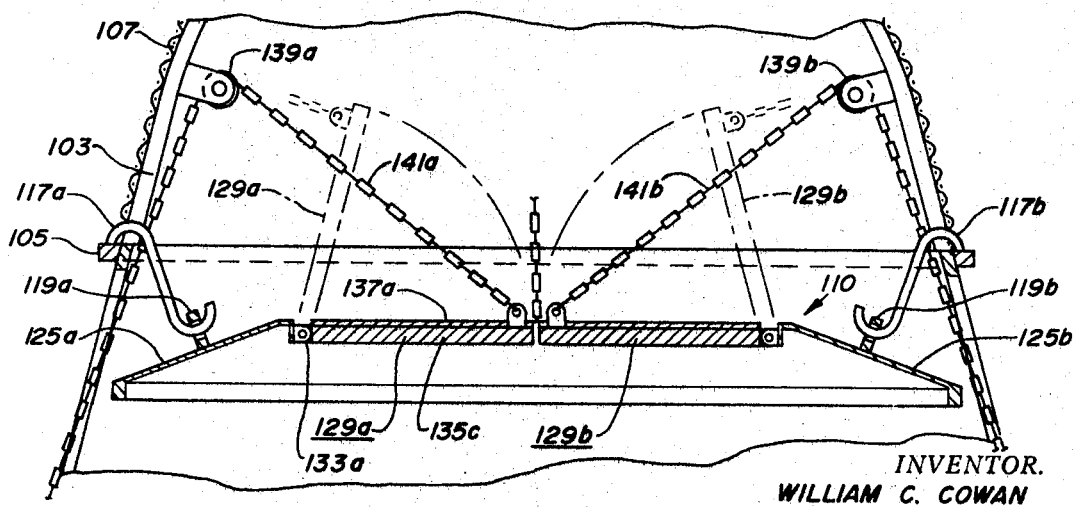
FIG. 6 is a vertical plane sectional view taken as on the line VI-VI of FIG. 4.

The second embodiment of the invention (FIGS. 4 - 6) is indicated by numeral 91 and is adapted to be used with conventional industrial burner means 93 including a conical burner body 95 having lower, upper and intermediate body sections 97, 99, 101, respectively; the burner having framework 103 supported on burner body circular rim 105, a generally conical screen 107 supported on framework 103, and a plurality of tangentially fitted draught ventilators 109 arranged circumferentially intermittently on burner body lower section 97.

Draught regulating mechanism 91 of the second embodiment of the invention comprises baffle means 110 including a first baffle portion or generally thick annular baffle body 111 having generally circular outside rim structure 113 and inside rim structure 115, preferably configured square and including rim inside rim portions 115a, 115b, 115c, 115d. Stay hooks 117a, 117b, 117c, 117d intermittently spaced about the periphery of baffle body 111 stationarily supports the baffle body horizontally in burner body intermediate section 101. Each of stay hooks 117a, 117b, 117c, 117d is hooked over circular rim 105 of burner body 95. Brackets 119a, 119b, 119c, 119d fixed in the upper portion of baffle body 111 engage the lower hooked portions of stay hooks 117a, 117b, 117c, 117d.

Baffle body 111 preferably includes framework structure including outside rim structure 113 and inside rim structure 115a, 115b, 115c, 115d and includes radially and diagonally extending horizontal reinforcing members 121, 123 rigidly interconnecting respectively inside and outside rim structure 113; 115a, 115b, 115c, 115d. Cresent-shaped side plates 125a, 125b, 125c, 125d are arranged over framework structure 121, 123 and bridgingly interconnect outside rim structure 113 with inside rim structure 115a, 115b, 115c, 115d of baffle body 111. Each side plate extends generally horizontally and integrally connects with an adjacent right angularly arranged side plate along a respective vertical seam 127a, 127b, 127c, 127d arranged at each corner of inside rim structure 115. Each side plate 125a, 125b, 125c, 125d is fixedly secured on an upper surface portion of outside rim structure 113 and extends upwardly inwardly obliquely and is fixedly secured along a straight horizontal line on a respective one of inside rim side portions 115a, 115b, 115c, 115d. It will be understood that baffle body 111, if desired, may be of a flat disposition like the first described embodiment rather than the conical shaped, as hereinabove described, without departing from the spirit and scope of the present invention.

Baffle means 110 includes draught doors 129a, 129b, 129c, 129d respectively hingedly secured by pivot means 131a, 131b, 131c, 131d respectively on baffle body inside rim structure 115a, 115b, 115c, 115d. Each draught door 129 is pivotally supported on a stationary axis arranged generally in the upper portion of baffle body inside rim structure 115. For example, pivot axis 133a of draught door 129a is arranged at the upper portion of baffle body inside rim portion 115a (see FIGS. 4 and 6).

Each draught door 129 is adapted to be pivotally moved between a horizontally planar closed disposition and an oblique upwardly open disposition, or if desired, each draught door 129 may be pivotally moved between a horizontally planar disposition and an oblique downwardly open disposition. In other words, the effective opening of the baffle means 110 of the second embodiment, which baffle means 110 is understood to mean draught doors 129a, 129b, 129c, and 129d and baffle body 111, may be changed by swinging the angle of the draught doors either upwardly or downwardly. The configuration and arrangement of each draught door 129 of plurality of draught doors 129a, 129b, 129c, 129d is such that the marginal edge portions of adjacent doors 129 substantially parallel engage when the plurality of draught doors 129 are in a horizontally planar closed arrangement (see FIGS. 5 and 6). Each draught door 129 preferably is formed from a generally thin triangular framework 135 and a triangular top plate 137. For example, draught door 129a is formed from framework 135a formed of triangular arranged base and side frame portions 135b, 135b' and a reinforcing strut member 135c. Top plate 137a is fixedly secured on the upper surfaces respectively of framework members 135a, 135b, 135b', 135c.

Draught regulating mechanism 91 includes means for pivotally adjustably positioning each draught door 129 between an open and closed disposition and thus the plurality of draught doors 129a, 129b, 129c, 129c correspondingly between open and closed dispositions. Preferably each draught door 129 is individually operative and preferably includes a winch unit 137 supported on burner body lower section 97, and pulley and rope means 139, 141 operative for selective manipulation of each draught door 129. Winch units 137a, 137b, 137c, 137d; pulley means 139a, 139b, 139c, 139d; and rope means 141a, 141b, 141c, 141d provide means for selective manipulation respectively of doors 129a, 129b, 129c, 129d. Each winch unit 137 preferably includes respectively bidirectionally operative electric motor means 143a, 143b, 143c, 143d operating power output drum means 145a, 145b, 145c, 145d. By momentarily energizing selective ones of motor means 143, draught doors 129 may be arranged as desired and the size and capacity of draught opening 147 may be accurately controlled. It will be understood that motor means 143 may be automatically controlled by suitable means or, if desired, in place of motor means 143, each winch unit 137 may be hand manipulated like that heretofore described for the first embodiment.

I claim:

1. In an industrial waste burner including a generally conical substantially thin-walled body having a lower section thereof defining enclosure means for the receiving and burning of waste material fuel and with said waste burner including an intermediate section defining a vertical flue windway and an upper section having means for passage of combustion air and residue into the atmosphere, apparatus for regulating the draught of combustion in said burner body comprising baffle means in said body extending across a major portion of said windway, said baffle means including a first portion and a second portion changeable relative to said first portion for varying the effective opening of said baffle means to control the passage of combustion air and residue through said intermediate section and into said upper section and the outside atmosphere, and actuating means operably coupled to said second portion changing said second portion relative to said first portion to vary the amount of air and residue passing through said intermediate section and into said upper section and the outside atmosphere.

2. For use with a large industrial waste burner, having a generally conical vertical substantially thin-walled body having a lower section thereof defining enclosure means for the receiving and burning of waste material fuel, having an intermediate section defining a vertical flue windway terminating substantially in circular rim structure and having an upper section formed at least in part of perforated material for passage of combustion air and residue into the atmosphere; apparatus for regulating the draught of combustion in said burner body comprising an annular horizontal first baffle having outside rim structure, and inside rim structure arranged concentrically of said outside rim structure and defining a large opening, an annular horizontal second baffle having outside rim structure and inside rim structure arranged concentrically of said outside rim structure and defining a large opening substantially smaller than the opening of said first baffle; and means for positioning said first and second baffles in said burner body concentrically to a common vertical axis with said second baffle being disposed directly above said first baffle, and with said positioning means including means for vertically manipulating one baffle relative to the other baffle for selectively varying the distance between the baffles to vary the draught of combustion in the burner body.

3. The draught regulating apparatus of Claim 2 wherein said means for positioning said first and second baffles includes means for stationarily securing said first baffle at a certain level in the intermediate section of said burner body with the outside rim structure of said first baffle being concentrically radially inwardly arranged contiguous the conical interior surfaces of said burner body intermediate section, and includes means for vertically manipulating said second baffle relative to said first baffle.

4. The draught regulating apparatus of Claim 3 wherein said means for vertically manipulating said second baffle relative to said first baffle includes a plurality of windlass mechanisms intermittently arranged about said burner body with each windlass mechanism including a drum journaled on the outside of said burner body lower section, a pulley journaled on said burner body upper section at an elevation substantially above said second baffle, an elongated flexible pull member extending over said pulley and having opposite ends firmly secured respectively to said windlass drum and said second baffle, and handle means connected to said drum for turning the drum and vertically manipulating said second baffle.

5. The draught regulating apparatus of Claim 2 wherein said second baffle outside rim structure is substantially the size of said first baffle inside rim structure, and stop means is attached to said second baffle for engaging said first baffle to limit downward movement of said second baffle relative to said first baffle.

6. For use with an industrial conical burner having a screened outlet arranged at its apex for the emission of combustion gases and residue of combustion, an apparatus comprising combustion air draught regulating means including two vertically spaced centrally apertured baffle members arranged in the upper interior of the burner and with one of the apertured baffle members being movable relative to the other for regulating the flow of combustion gases and residue emitted into the outside atmosphere.

7. The combination as defined in Claim 1 wherein said apparatus for regulating the draught of combustion in said burner body includes an annular horizontal first baffle having concentrically arranged inside and outside rim structure with said inside rim structure defining a large draught opening, means stationarily supporting said first baffle in the intermediate section of said burner body with the outside rim structure of said first baffle being contiguously concentrically arranged relative to said burner body, an annular horizontal second baffle disposed in said intermediate section having concentrically arranged inside and outside rim structure substantially smaller in diameter respectively than the diameter of the inside and outside rim structure of said first baffle, and means for adjustably vertically positioning said second baffle directly concentrically over said first baffle including means for vertically manipulating said second baffle relative to said first baffle for selectively varying the distance between the baffles and for operatively varying the draught of combustion in the burner body.

8. The combination as defined in Claim 1 wherein said apparatus for regulating the draught of combustion in said burner body includes baffle means including an annular baffle body having inside rim structure defining a draught opening defined substantially by a plurality of straight rim side portions, means stationarily supporting said baffle body horizontally in the intermediate section of said burner body with the outside circumferential portions of said burner body being contiguously arranged relative to the inside circumferential surface of the burner body intermediate section, a plurality of draught doors corresponding in number with the number of side portions of said inside rim structure of said baffle body, hinge means pivotally interconnecting the proximal edge portion of each draught door to a respective rim side portion of said draught body, each draught door being adapted to be pivotally moved between a horizontally planar closed disposition operably occluding passage of combustion gases from said burner body, and an angular open disposition permitting passage of combustion gases from the burner body, and including means for pivotally adjustably positioning each door of said plurality of draught doors at a selected disposition between said horizontally planar closed disposition and said angular open disposition.

9. The combination as defined in Claim 8 wherein said means for pivotally adjustably positioning each door of said plurality of draught doors includes a winch unit supported on said burner body lower section including an electric motor and power output rope drum means, and includes a pulley journaled on said burner body upper section and rope means tautly reeved over said pulley having opposite end portions fixed respectively on said winch drum and the distal portion of said draught door.

10. The combination as defined in claim 8 wherein the configuration and arrangement of each draught door of said plurality of draught doors are such that the marginal edge portions of adjacent doors of said plurality of draught doors are contiguously arranged when said doors are in closed horizontally planar arrangement.

11. The combination as defined in Claim 10 wherein said draught opening is generally square and said straight rim side portions of said baffle body are square arranged, and wherein said draught doors each are configured alike and each triangular.

12. In an industrial waste burner including a generally conical substantially thin-walled body having a lower section thereof defining enclosure means for the receiving and burning of waste material fuel and with said waste burner including an intermediate section defining a vertical flue windway and an upper section having means for passage of combustion air and residue into the atmosphere, apparatus for regulating the draught of combustion in said burner body comprising baffle means in said body extending across a major portion of said windway, said baffle means including a first portion and a second portion, said second portion having an outside rim structure, means stationarily holding said second portion in place in said body with said outside rim structure being disposed contiguously of the inside surface of said burner body, means movably mounting said first portion for movement relative to said second portion for varying the effective opening of said baffle means to control the passage of combustion air and residue through said intermediate section and into said upper section and the outside atmosphere, and actuating means operably coupled to said second portion changing said first portion relative to said second portion to vary the amount of air and residue passing through said intermediate section and into said upper section and the outside atmosphere.